(12) United States Patent
Nagamoto

(10) Patent No.: US 6,664,470 B2
(45) Date of Patent: Dec. 16, 2003

(54) PILLAR GARNISH FASTENING STRUCTURE

(75) Inventor: Satoru Nagamoto, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/294,054

(22) Filed: Nov. 13, 2002

(65) Prior Publication Data

US 2003/0094828 A1 May 22, 2003

(30) Foreign Application Priority Data

Nov. 19, 2001 (JP) ........................................ 2001-352840

(51) Int. Cl.[7] ................................................ H02G 3/18
(52) U.S. Cl. ................. 174/65 G; 174/153 G; 16/2.1; 248/56
(58) Field of Search .......................... 174/65 G, 65 R, 174/65 SS, 31 R, 153 G, 152 G; 16/2.1, 2.2; 248/56; 439/604

(56) References Cited

U.S. PATENT DOCUMENTS

| | | | | |
|---|---|---|---|---|
| 6,081,964 A | * | 7/2000 | Mori | 16/2.2 |
| 6,278,060 B1 | * | 8/2001 | Mori | 174/65 G |
| 6,372,986 B1 | * | 4/2002 | Saeki et al. | 174/65 G |
| 6,431,642 B2 | * | 8/2002 | Sora et al. | 296/208 |
| 6,479,748 B2 | * | 11/2002 | Mori | 174/65 G |
| 6,600,105 B2 | * | 7/2003 | Nakata et al. | 174/65 G |

FOREIGN PATENT DOCUMENTS

JP      B-5-39973      10/1993

* cited by examiner

Primary Examiner—Dhiru R Patel
(74) Attorney, Agent, or Firm—Merchant & Gould P.C.

(57) ABSTRACT

A first fastener is constituted by a grommet having a diametrically expandable divided distal end portion and a cap provided with a pres-fit pin adapted to be press fitted in the grommet, the divided distal end portion of the grommet is inserted into a through hole in the pillar, and the press-fit pin is press fitted in the grommet, whereby the press-fit pin is attached to the grommet and the diametrical contraction of the grommet is prevented by the press-fit pin.

4 Claims, 13 Drawing Sheets

PILLAR GARNISH FASTENING STRUCTURE

BACKGROUND OF THE INVENTION

1. Field of the Invention

The present invention relates to a pillar garnish fastening structure which can strongly attach a pillar garnish to a pillar, suppress an increase in cost and permit an easy removal of the pillar garnish from the pillar when required.

2. Description of the Related Art

Known as a pillar garnish fastening structure for attaching a garnish as a trim to a front pillar, a center pillar or a rear pillar which supports a roof of a vehicle is one described in, for example, JP-B-5-39973U entitled "AUTOMOBILE TRIM PANEL ATTACHING STRUCTURE."

As shown in FIG. 14, the above Japanese Examined Utility Model Publication has a structure for attaching a trim panel 212 to a center pillar 210 by piercing a through hole 210a in the center pillar 210, inserting a tongue 212k on the trim panel 212 and inserting a clip 18 into the tongue 212k.

The clip 218 is a member including a bevel head portion 218a and a stem 218b extending from the bevel head portion 218a and adapted to provide flexibility by forming a bored portion 218c in the interior of the stem 218b.

The stem 218b of the clip 218 is a member which is expanded at a central portion thereof, and the stem 218b is put in a diametrically expanded state after it has been inserted into the tongue 212k on the trim panel 212. In attempting to remove the clip 218 in this condition from the tongue 212k, the stem 218b diametrically contracts and is then easily removed. Thus, the clip 218 cannot be used as a fastener, in particular, in such as the trim panel 212 to which a large magnitude of external force tends to be applied.

Then, in order to obtain a large fastening force, it is conceivable that the clip 218 is enlarged to increase the outside diameter of the stem 218b and the diameter of the hole in the tongue 212k or that a bolt is used instead of the clip 218 and a nut is welded to an internal surface of the center pillar 210, so that the trim panel 212 is fastened to the center pillar 210 with the bolt and nut. However, this calls for a great increase in costs.

On the other hand, since there occurs a case where the trim panel 212 has to be removed from the center pillar for some reason like servicing, the clip 218 is also required to be easily removed.

SUMMARY OF THE INVENTION

An object of the invention is to provide an improvement in the pillar garnish fastening structure which can strongly attach the pillar garnish to the pillar, suppress an increase in costs due to the improvement and permit an easy removal of the pillar garnish from the pillar when required.

With a view to attaining the object, according to a first aspect of the invention, there is provided a pillar garnish fastening structure for attaching a pillar garnish with a fastener to a passenger compartment side of a pillar supporting a roof of a vehicle, the pillar garnish fastening structure being characterized in that the fastener is constituted by a grommet having a diametrically expandable divided distal end portion and a cap provided with a pin adapted to be press fitted in the grommet, in that the divided distal end portion of the grommet is inserted into a hole in the pillar, and in that the pin is press fitted in the grommet, whereby the pin is attached to the grommet and the diametrical contraction of the grommet is prevented by the pin.

The pin is attached to the grommet by press fitting the pin into the grommet and the diametrical contraction of the grommet is prevented by the pin, so that an external surface of the grommet can be kept strongly pressed against the hole in the pillar and the removal of the grommet from the hole is made difficult, whereby the pillar garnish can strongly be attached to the pillar.

In addition, since the pillar garnish attaching hole provided in the pillar may have the same configuration as that for the conventional pin, even when the grommet according to the invention is attempted to be used, no special machining is required. Consequently, it is possible to deal with both vehicle specifications having and not having side air bags by using the same pillar garnish attaching holes but selectively using the conventional clip and the grommet, thereby making it possible to suppress an increase in costs.

Furthermore, since the press-fit pin is only press fitted into the grommet, in the event that the pillar garnish has to be removed for some reason, for example, servicing, the grommet diametrically contracts when the press-fit pin is pulled out of the grommet, whereby the pillar garnish can be easily removed from the pillar.

According to a second aspect of the invention, a locking piece adapted to be locked into the pillar garnish is provided on the cap.

The removal of the pin provided on the cap from the grommet can be made difficult by the locking piece provided on the cap.

DETAILED DESCRIPTION OF THE PREFERRED EMBODIMENTS

Figure 1:
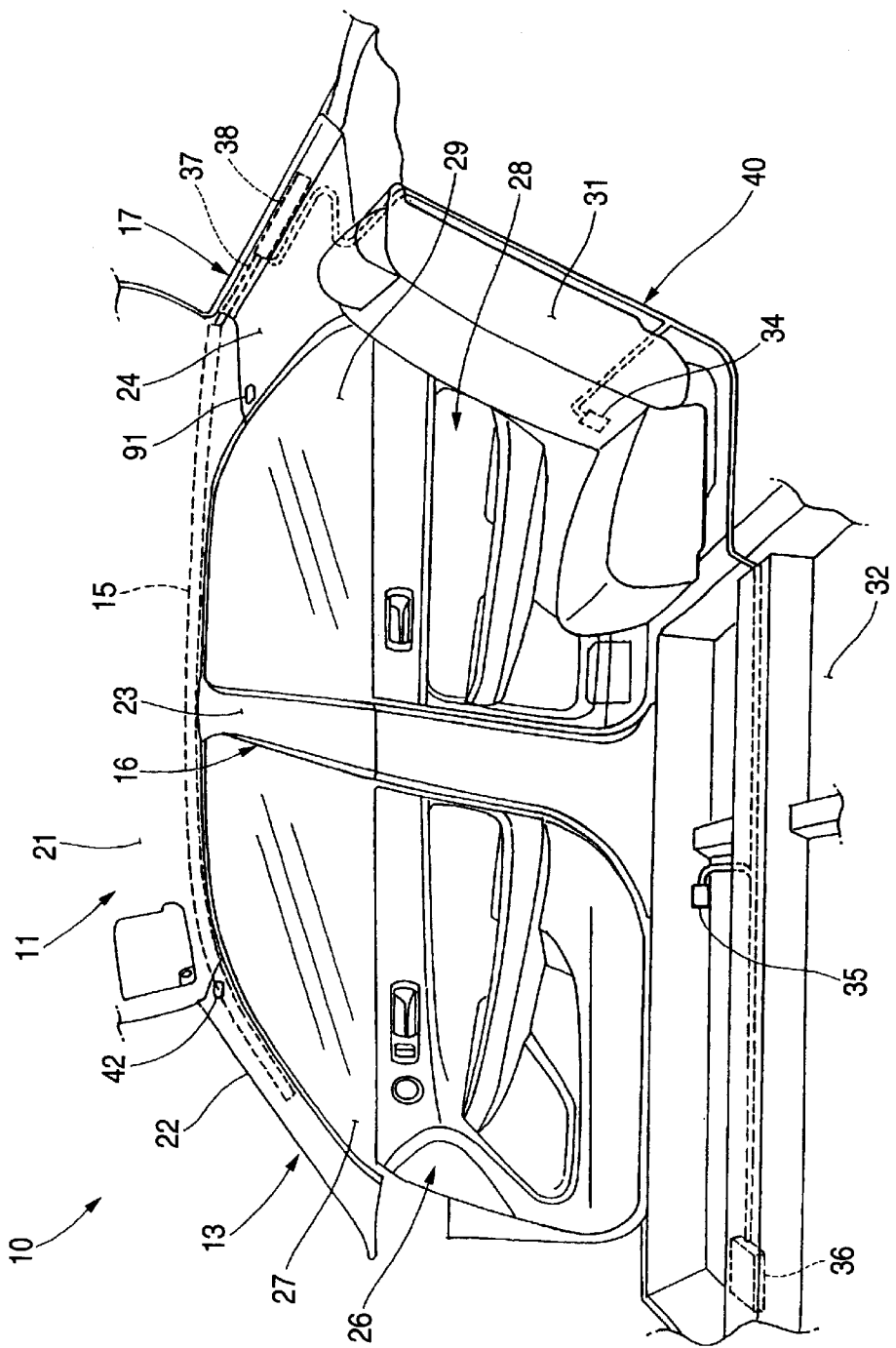
FIG. 1 is a side view showing a passenger compartment side of a vehicle to which a pillar garnish fastening structure according to the invention is applied.

An embodiment of the invention will be described below with reference to the accompanying drawings. Note that the drawings are viewed in a direction in which reference numerals are oriented.

FIG. 1 is a side view showing a passenger compartment side of a vehicle to which a pillar garnish fastening structure according to the invention is applied, and a side airbag 15 for protecting upper bodies, in particular, heads of passengers when the vehicle is involved in a side collision is shown as being incorporated in a side edge portion of a roof 11 and part of a front pillar 13 of the vehicle 10.

Here, reference numeral 16 denotes: a center pillar; 17: a rear pillar; 21: a roof lining which constitutes a trim of the roof 11; 22: a front pillar garnish constituting a trim of the front pillar 13; 23: a center pillar garnish constituting a trim of the center pillar 16; 24: a rear pillar garnish constituting a trim of the rear pillar 17; 26: a front door; 27: a front door window glass; 28: a rear door; 29: a rear-door window glass; 31: a rear seat; and 32: a floor.

The side air bag 15 is a member constituting an air bag system 40 together with impact sensors 34, 35 disposed at the rear of the rear seat 31 and on the floor 32 for detecting impact generated when the vehicle is involved in a side collision, a control unit 36 for processing impact signals from the impact sensors 34, 35 and an inflator 38 for supplying expanded gas to the side air bag 15 through a piping 37 by igniting stored gunpowder when receiving a signal from the control unit 36.

Figure 2:
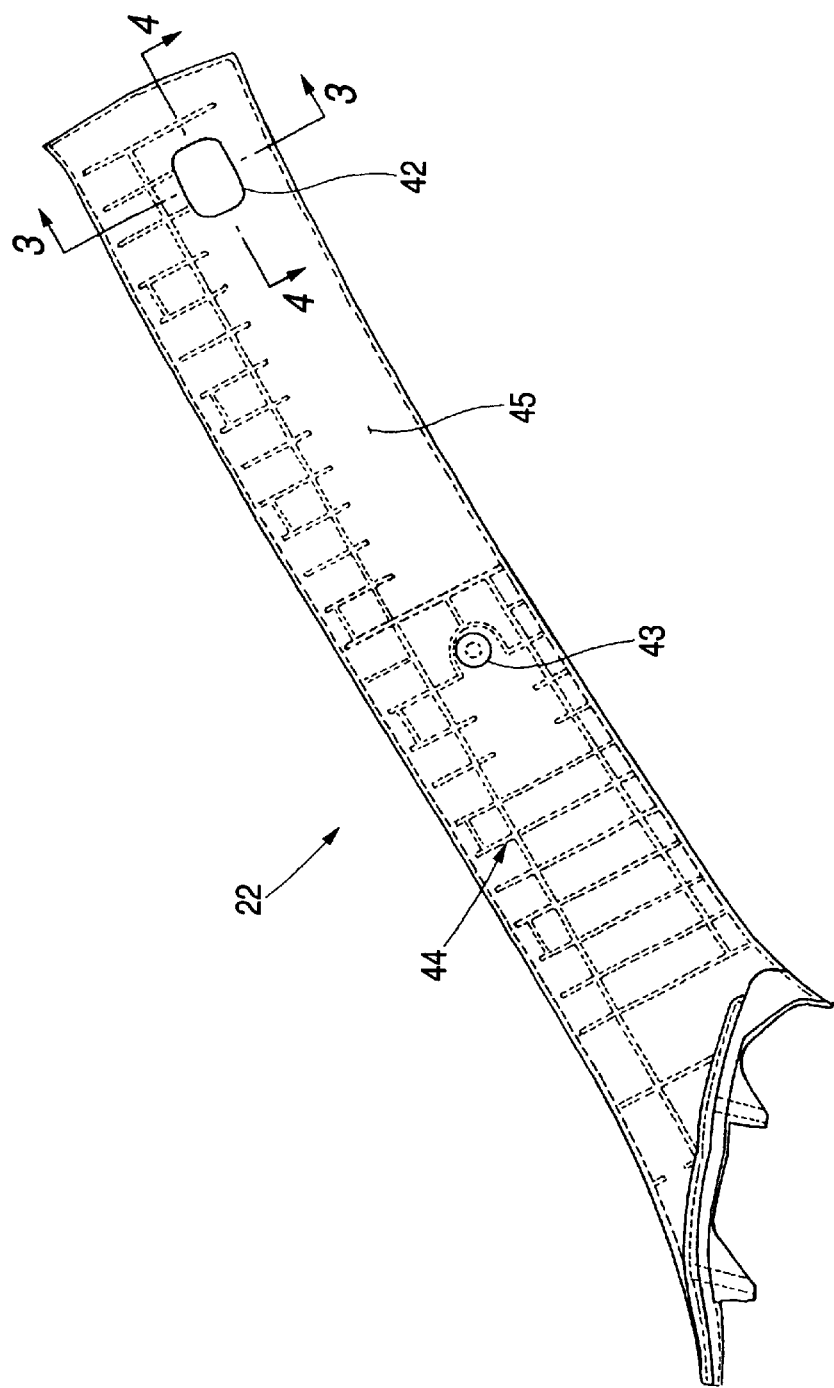
FIG. 2 is a side view of a front pillar garnish according to the invention.

FIG. 2 is a side view of a front pillar garnish according to the invention and shows the front pillar garnish 22 being fastened to the front pillar 13 (refer to FIG. 1) with a first fastener 42 and a second fastener 43.

The front pillar garnish 22 is a member whose rigidity is increased by forming rib groups 44 each comprising a plurality of ribs on the back thereof and in which a rib-free portion 45 where no rib group 44 is formed is provided, in particular, in the vicinity of the first fastener 42 in order to dispose the side air bag 15 therein and to reduce the rigidity of the front pillar garnish 22 thereat. The first fastener 42 is a member constituting the pillar garnish fastening structure according to the invention, and the second fastener 43 is a member identical to a clip 104 (refer to FIG. 8) which will be described later.

Figure 3:
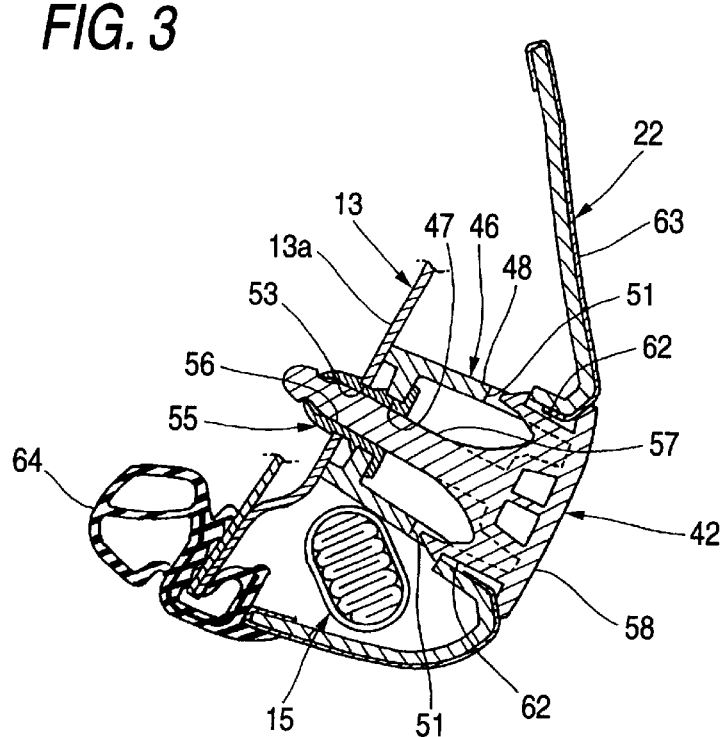
FIG. 3 is a cross-sectional view taken along the line 3—3 in FIG. 2.

FIG. 3 is a cross-sectional view taken along the line 3—3 in FIG. 2, and the front pillar garnish 22 is a member having provided therein a recessed portion 46, a bottom hole 47 pierced in the bottom of the recessed portion 46 and side windows 51, 51 opened in a side wall 48 of the recessed portion 46 and in which the side air bag 15, which is folded, is disposed below the recessed portion 46.

The first fastener 42 includes a grommet 55 and a cap 58. The grommet 55 is made of a hard resin and is adapted to inserted into the bottom hole 47 in the front pillar garnish 22 and a through hole 53 pierced through an inner panel 13a of the front pillar 13 as a pillar side hole at its distal end portion. The a cap 58 is made of a hard resin and is provided with a press-fit pin 57 functioning as a pin adapted to be press fitted into a central hole 56 pierced at the center of the grommet 55.

Here, reference numerals 62, 62 denote locking pieces provided on the cap 58 to be hooked in the side windows 51, 51 in the front pillar garnish 22; 63: a skin affixed to a surface of the front pillar garnish 22; and 64: a sealing rubber for closing gaps between the inner panel 13a of the front pillar 13 and the front pillar garnish 22 and a windshield (not shown).

Figure 4:
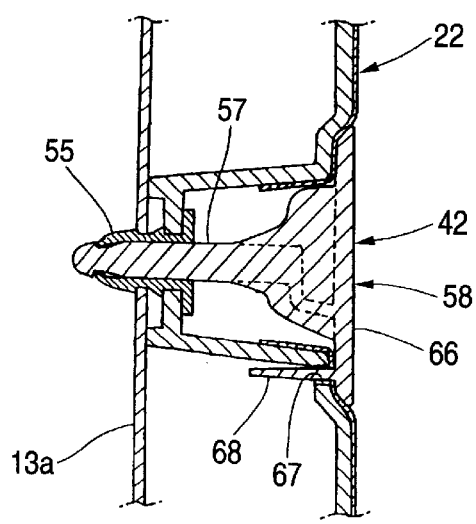
FIG. 4 is a sectional view taken along the line 4—4 in FIG. 2.

FIG. 4 is a sectional view taken along the line 4—4 in FIG. 2. A plate portion 66 which forms a plane substantially continuous with the surface of the front pillar garnish 22 is provided on a passenger compartment side of the cap 58 of the first fastener 42. A projection 68 is provided on this plate portion 66 which functions to stop the rotation of the cap 58 when inserted into a hole portion 67 formed in the front pillar garnish 22.

Figure 5:
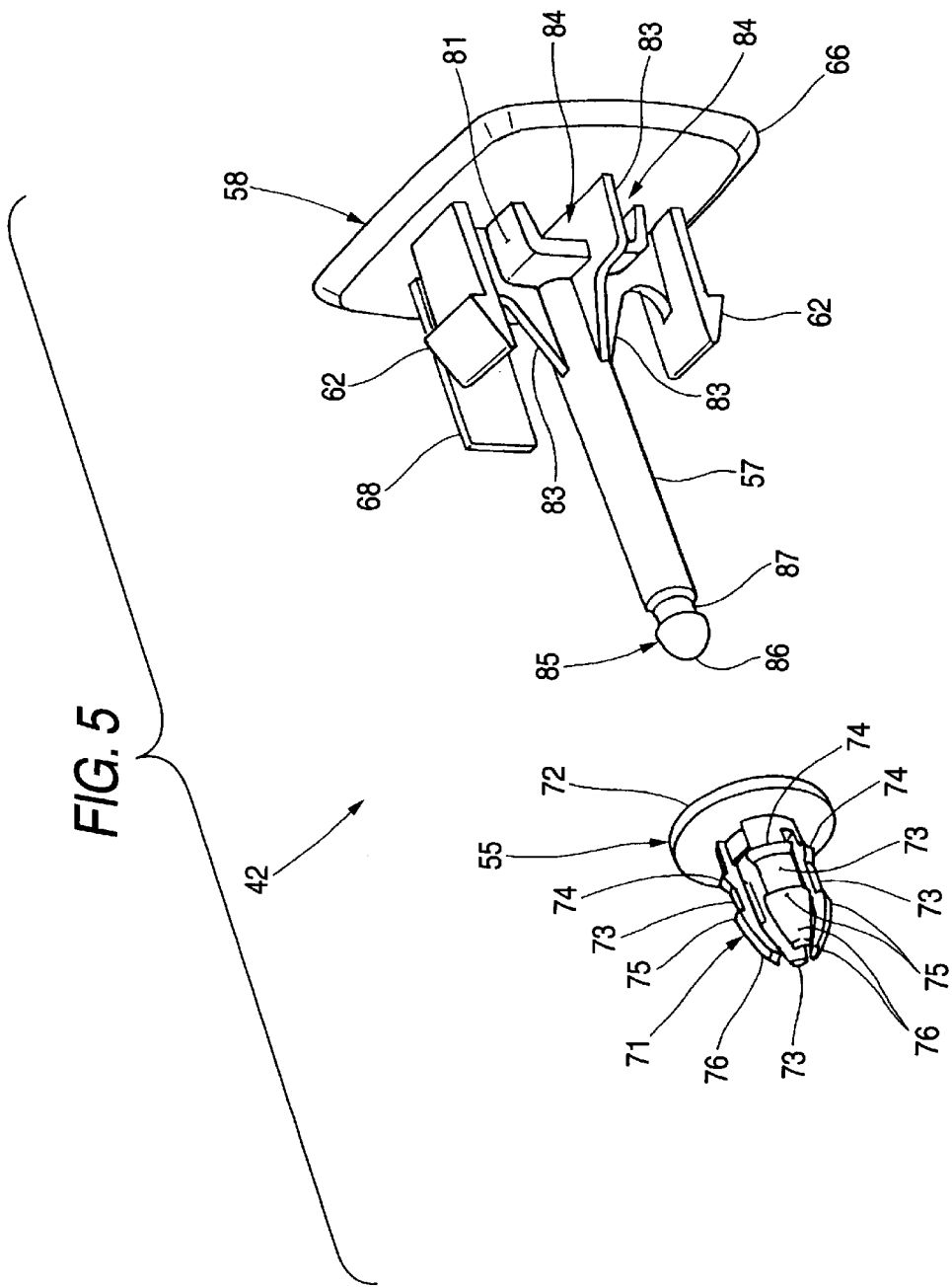
FIG. 5 is a perspective view showing a fastener according to the invention.

FIG. 5 is a perspective view showing the fastener according to the invention. The grommet 55 comprises a diametrically expandable divided distal end portion 71 which is divided into a plurality of pieces and a flange portion 72 formed integrally on the divided distal end portion 71. The divided distal end portion 71 has the plurality of divided pieces 73 . . . ( . . . indicates a plural number, and this similarly applies to the remaining part of the specification). Each of the plurality of divided pieces 73 . . . includes a first sectored projection 74 adapted to be hooked on an edge portion of the bottom hole 47 (refer to FIG. 3) in the front pillar garnish 22 (refer to FIG. 3), a second projection 75 adapted to be hooked on an edge portion of the through hole 53 (refer to FIG. 3) of the front pillar 13 (refer to FIG. 3) and a distal-end curved portion 76 which curves inwardly as it extends toward a distal end thereof.

The cap 58 includes the plate portion 66, a scaffold-like portion 81 provided at a central portion of the plate portion 66, the press-fit pin 57 erected on the scaffold-like portion 81, and the locking pieces 62, 62 and the projection 68 which are also erected from the plate portion 66. In addition, reference numerals 83 . . . denote pin-fall preventive ribs for preventing the fall of the press-fit pin 57.

The scaffold-like portion 81 is a portion for preventing the deformation of the plate portion 66 due to the contraction of the scaffold-like portion 81 that would occur when the cap 58 hardens during the molding thereof by providing hollow portions 84, 84.

The press-fit pin 57 is a part whose distal end portion is constituted by a curved portion 86 for easing the press fit of the pin into the grommet 55 and an annular groove 87 in which the distal curved portions 76 . . . of the grommet 55 fit.

Figure 6:
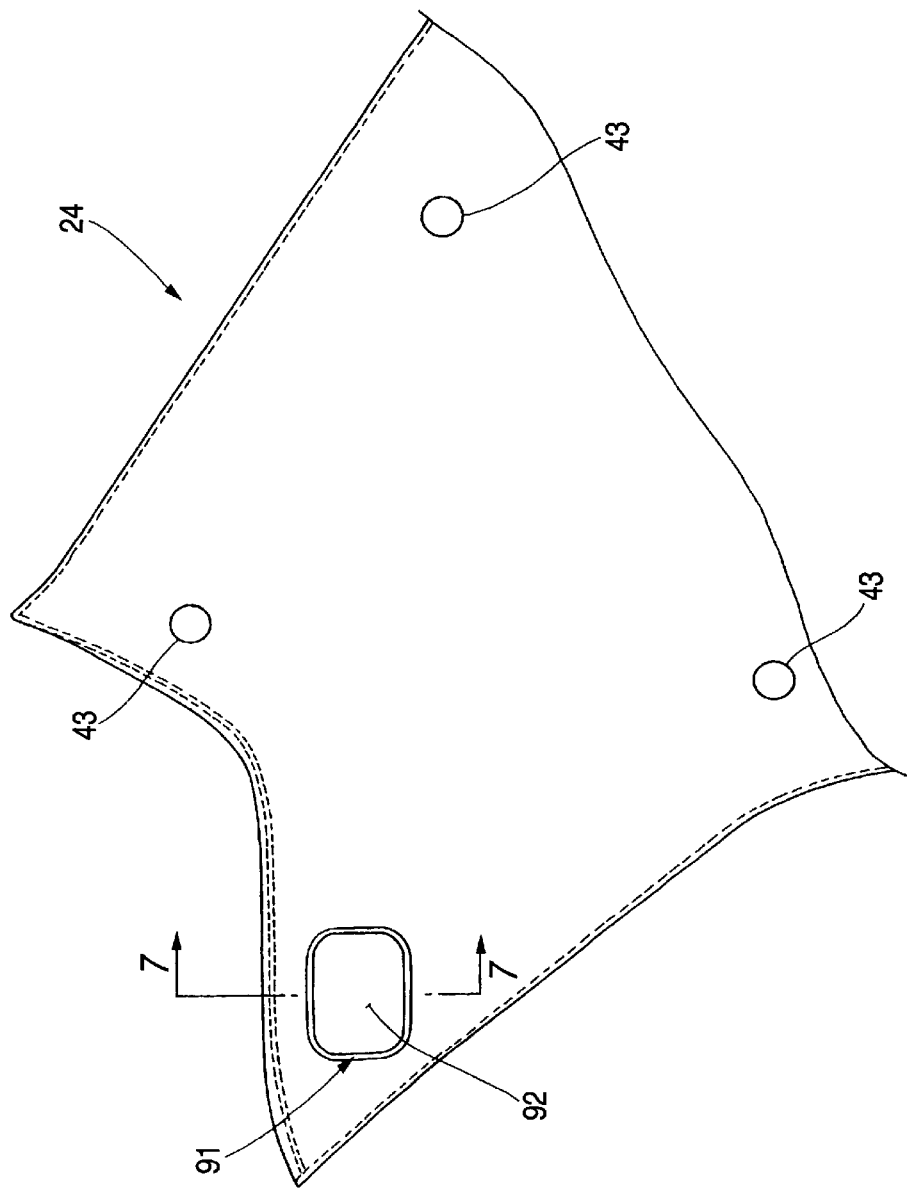
FIG. 6 is a side view of a rear pillar garnish according to the invention.

FIG. 6 is a side view of a rear pillar garnish according to the invention and shows that the rear pillar garnish 24 is fastened to a rear pillar 17 (refer to FIG. 1) with a first fastener 91 and the second fasteners 43 . . .

While the first fastener 91 is identical to the first fastener 42 (refer to FIG. 3) with respect to the basic construction, the first fastener 91 is a member in which the configuration of a plate portion 92 is set to match the rear pillar garnish 24, and the configuration of the plate portion 92 is differentiated from that of the plate portion 66 of the first fastener 42.

Figure 7:
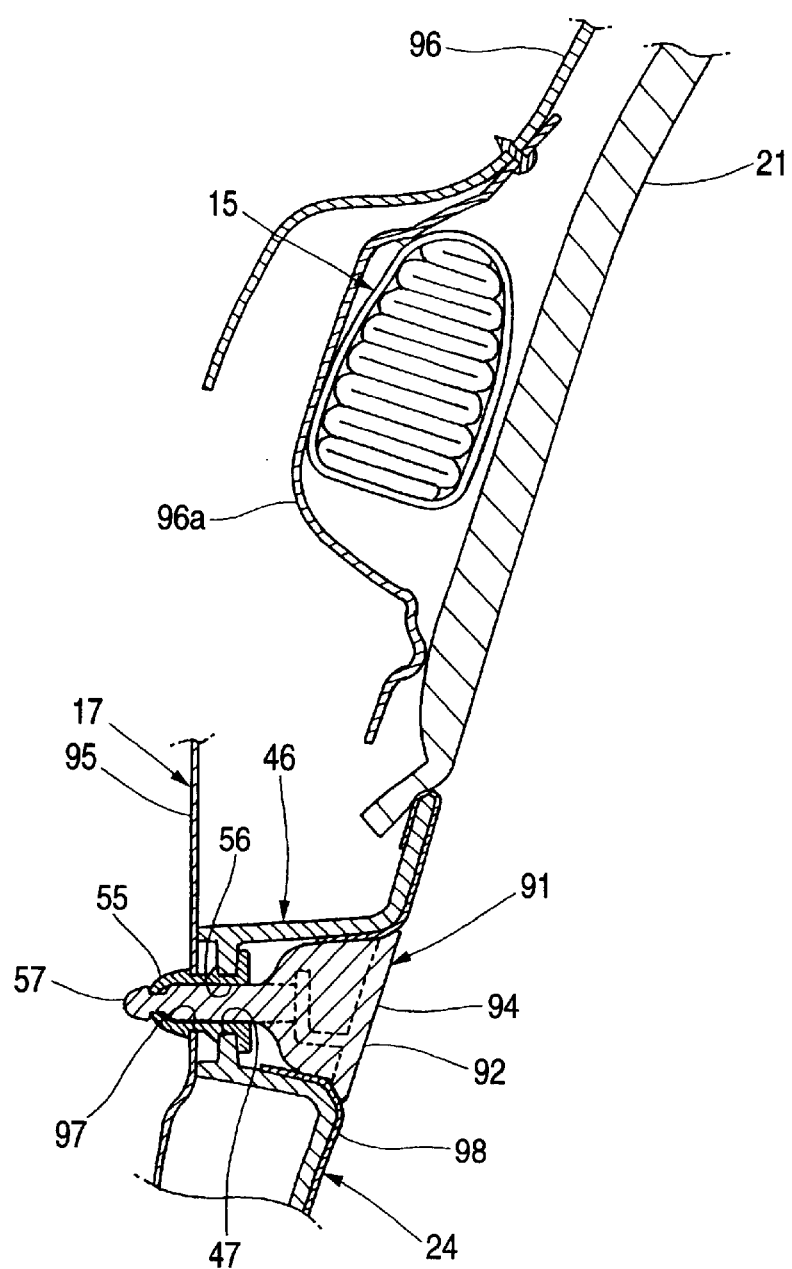
FIG. 7 is a sectional view taken along the line 7—7 in FIG. 6.

FIG. 7 is a sectional view taken along the line 7—7 in FIG. 6 and shows a state in which the rear pillar garnish 24 is attached to an inner panel 95 of the rear pillar 17 with the first fastener 91 comprising the grommet 55 and a cap 94. Note that the basic constructions of the respective portions (connecting portions to the rear pillar 17) of the rear pillar garnish 24 are identical to those of the front pillar garnish 22 (refer to FIG. 3).

A bracket 96a is attached to an inside of a side edge portion of a roof panel 96 of the roof 11 (refer to FIG. 1) inside a roof lining 21 above the rear pillar garnish 24, and the side air bag 15 is attached to the bracket 96a in a folded condition. In addition, reference numeral 97 denotes a through hole pierced through the inner panel 95 of the rear pillar 17 as a pillar side hole into which the grommet 55 is inserted; and 98: a skin affixed to the surface of the rear pillar garnish 24.

Figure 8:
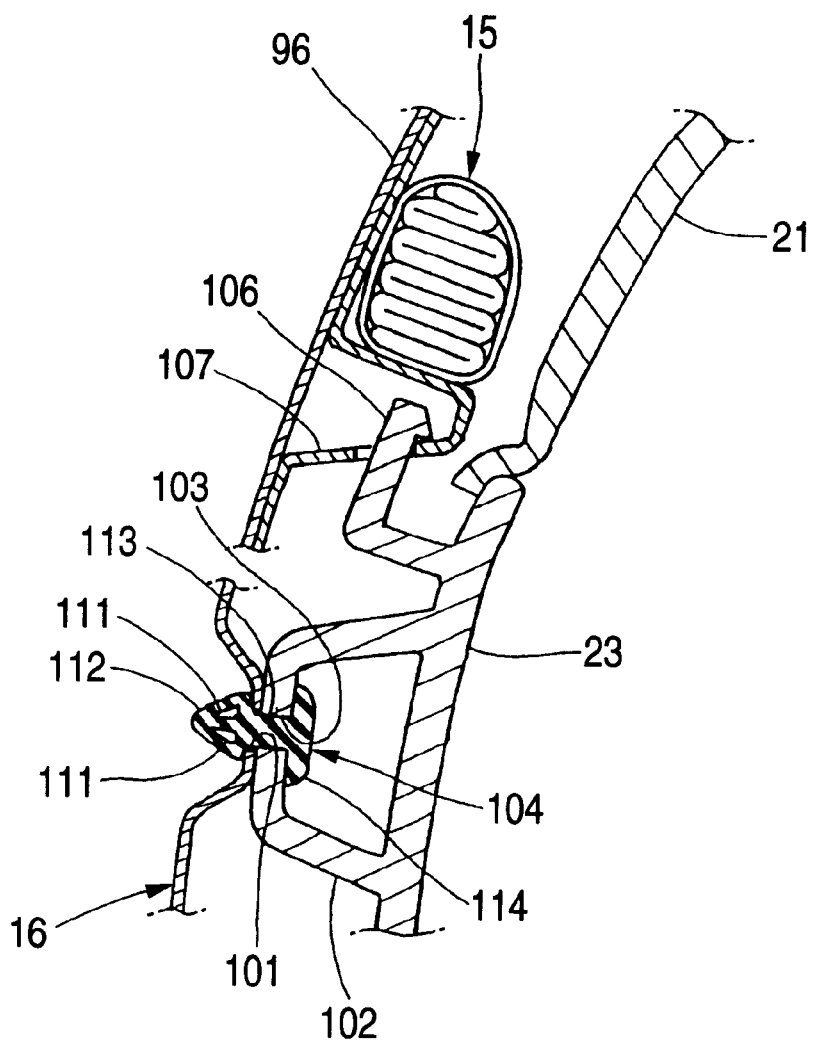
FIG. 8 is a sectional view explaining a center pillar garnish fastening structure for comparison with the pillar garnish fastening structure according to the invention.

FIG. 8 is a side view explaining a center pillar garnish fastening structure which is to be compared with the pillar garnish fastening structure according to the invention. A through hole 101 is pierced through a center pillar 16. An attaching hole 103 is pierced through a projecting portion 102 provided on the back of a center pillar garnish 23. The center pillar garnish 23 is attached to the center pillar 16 by inserting a clip 104 into those attaching hole 103 and through hole 101. In addition, reference numeral 106 denotes an L-shaped portion for hooking an upper portion of the center pillar garnish 23 on a bent portion 107 provided on the center pillar 16 side.

The clip 104 includes a conical distal end portion 112 which provides flexibility by forming hollow portions 111, 111 therein, a step portion 113 extending from the distal end portion 112 and a head portion 114 provided at an end of the stem portion 113 and makes difficult the removal of the clip 104 from the through hole 101 by allowing the distal end portion 112 to hook on an edge portion of the through hole 101 in the center pillar 16.

Next, the function of the pillar garnish fastening structure that has been described heretofore will be described.

Figure 9:
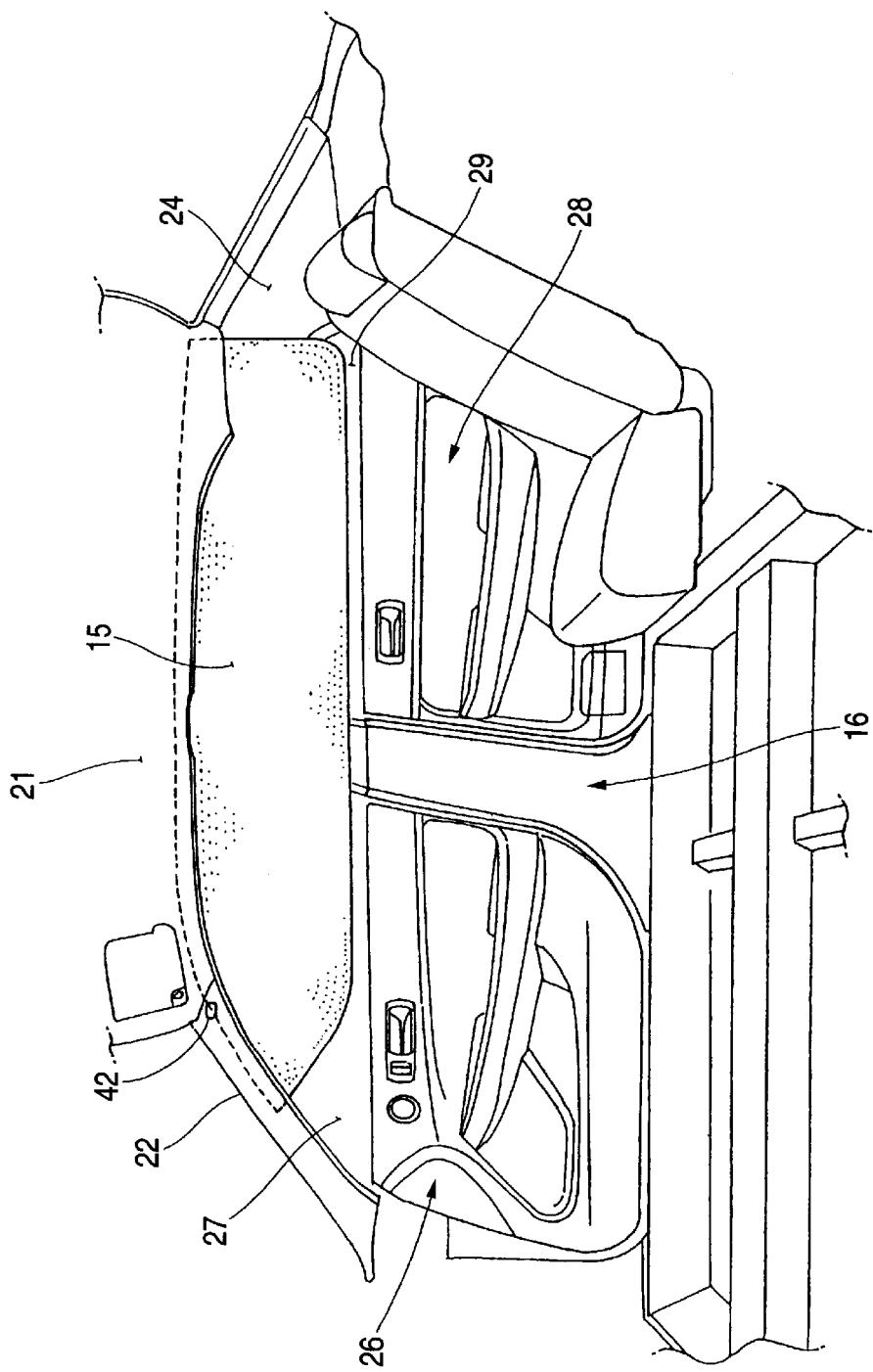
FIG. 9 is a first function-explaining diagram explaining the function of the pillar garnish fastening structure according to the invention.

FIG. 9 is a first function-explaining diagram for explaining the function of the pillar garnish fastening structure according to the invention. When a vehicle collides against the side of the body of the subject vehicle the impact sensors 34, 35 shown in FIG. 1 detect an impact generated by the collision, and the control unit 36 which has received signals from the impact sensors 34, 35 sends an ignition signal to the inflator 38 so as to ignite gunpowder compacted into the interior of the inflator 38, whereby the gunpowder combusts explosively, and gas expanded by the combustion then flows into the side air bag 15 through the piping 37.

As a result, in FIG. 9, the air-bag 15 is inflated and expands along a front door window glass 27 and a rear door window glass 29 immediately.

Conditions of the respective pillar garnishes with the side air bag 15 being in an expanded condition as shown in FIG. 9 will be described below.

Figure 10:
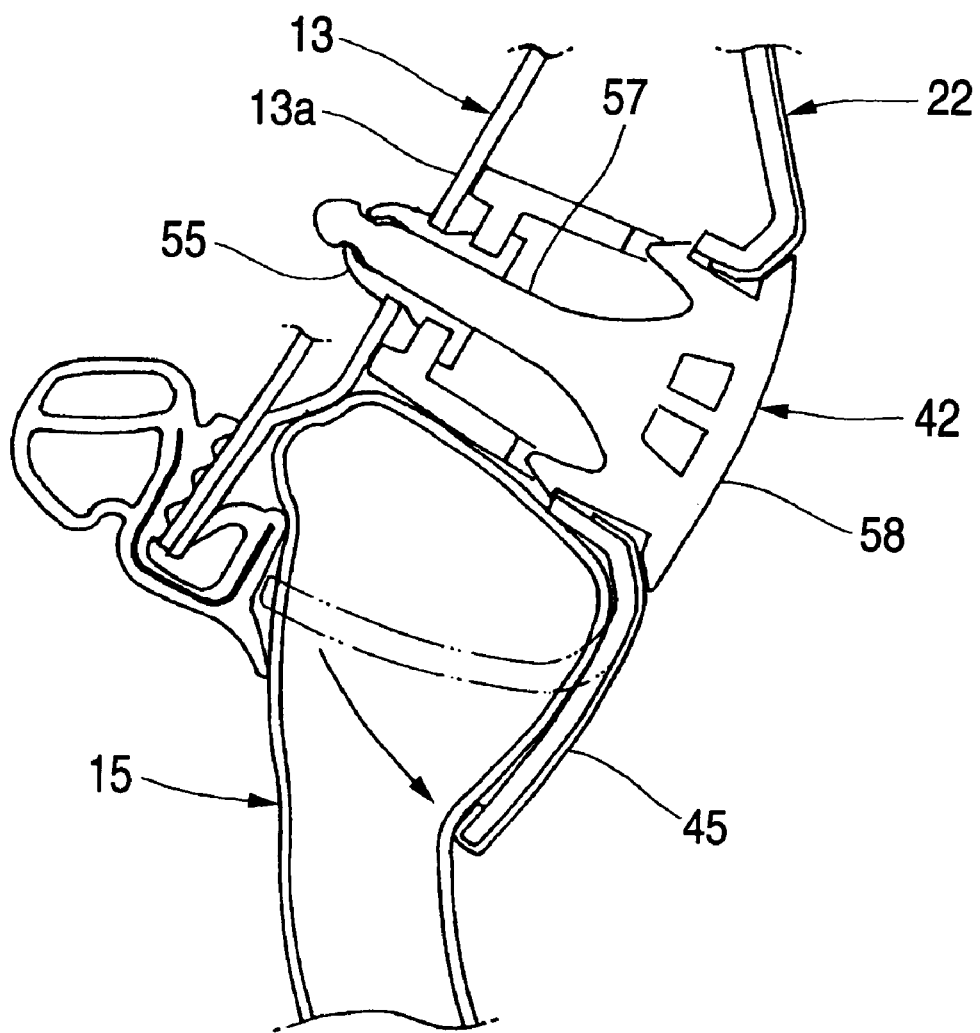
FIG. 10 is a second function-explaining diagram explaining the function of the pillar garnish fastening structure according to the invention.

FIG. 10 is a second function-explaining diagram explaining the function of the pillar garnish fastening structure according to the invention and shows a state in which the side air bag 15 is inflated at the front pillar 13 portion and displaces a lower portion or the rib-free portion 45 where no rib group 44 is provided as shown in FIG. 2 of the front pillar garnish 22 to deflect in a direction indicated by an arrow in FIG. 10 to thereby expand downwardly.

Thus, even if an external force which is large enough to deflect the rib-free portion 45 is applied to the front pillar garnish 22, the front pillar garnish 22 can be kept strongly attached to the front pillar 13 with the first fastener 42.

Figure 11:
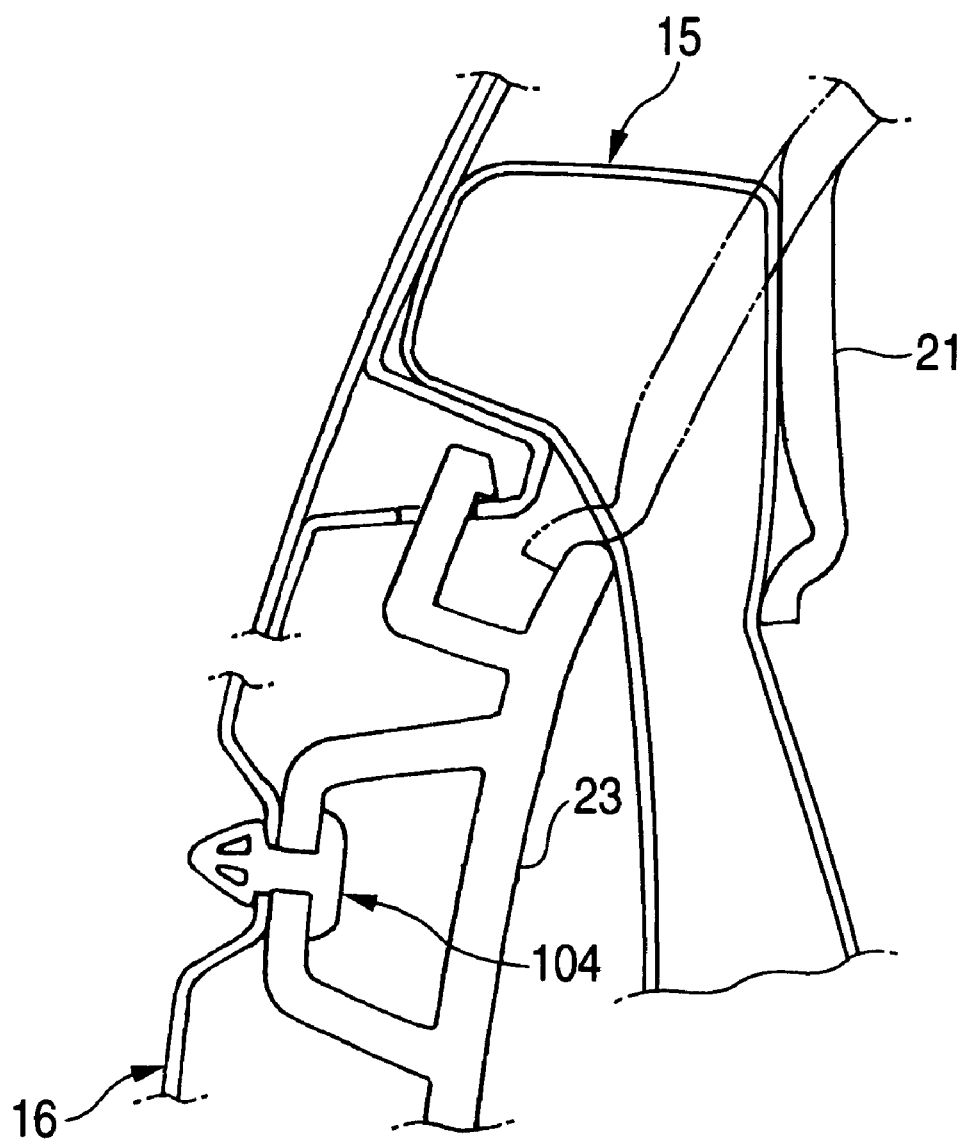
FIG. 11 is a function-explaining diagram for comparison with the function of the pillar garnish fastening structure according to the invention.

FIG. 11 is a function-explaining diagram for comparison with the function of the pillar garnish fastening structure according to the invention and shows a state in which the side air bag 15 is inflated at the center pillar 16 portion and displaces a lower portion of the roof lining 21 to deflect in a direction indicated by an arrow to thereby expands downwardly.

When the center pillar garnish 23 deflects, while a large force is applied to the center pillar garnish 23 so as to remove the center pillar garnish 23 from the center pillar 16, since the force so applied is received by the L-shaped portion 106 and the clip 104, there is no risk that the clip 104 comes off. However, in the event that the force is attempted to be supported by the clip 104 only, the clip 104 having a small fastening force comes off the center pillar 16.

Figure 12:
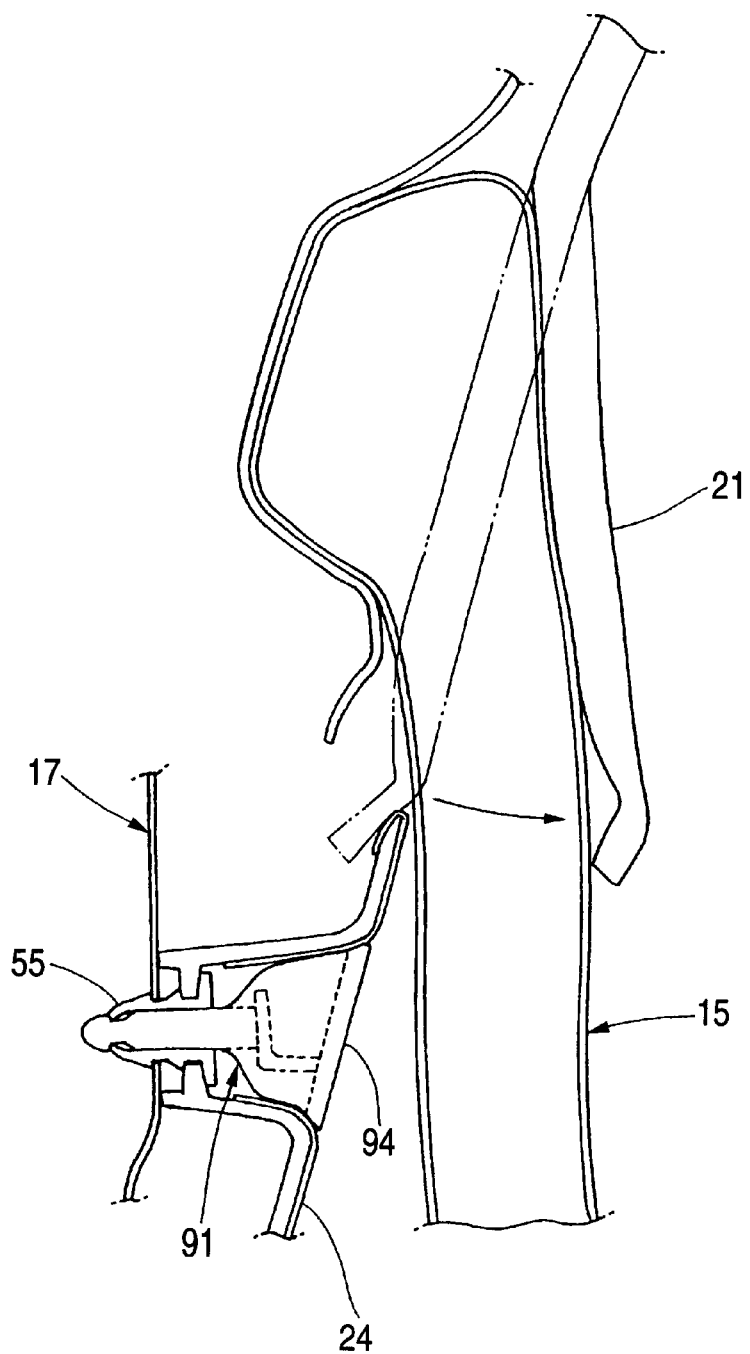
FIG. 12 is a third function-explaining diagram explaining the function of the pillar garnish fastening structure according to the invention.

FIG. 12 is a third function-explaining diagram for explaining the function of the pillar garnish fastening structure and shows a state in which the side air bag 15 is inflated at the rear pillar 17 portion and displaces the side edge portion of the roof lining 21 to deflect in a direction indicated by an arrow to thereby expand downwardly.

As this occurs, even if a large force which causes the roof lining 21 to ride over an upper end of the rear pillar garnish 24 is applied to the rear pillar garnish 24, the rear pillar garnish 24 can be kept strongly attached to the rear pillar with the first fastener 91.

FIGS. 13A to 13H are function-explaining diagrams for comparison of the functions of the pillar garnish fastening structures, in which FIGS. 13A to 13D illustrate a manner and a state in which the clip 104 (refer to FIG. 8), which functions as a comparable example, is fastened and FIGS. 13E to 13H illustrate a manner and a state in which the first fastener 42 according to the invention is fastened.

Figure 13:
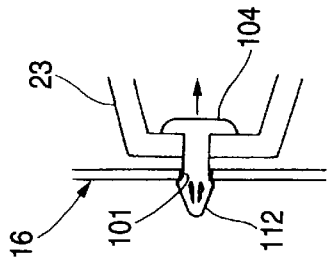
FIGS. 13a–13h are function-explaining diagrams for comparing the functions of the pillar garnish fastening structures.
Figure 13:
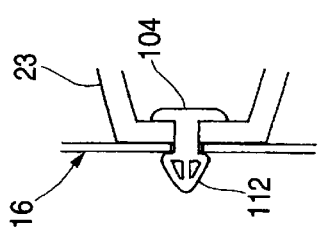
Figure 13:
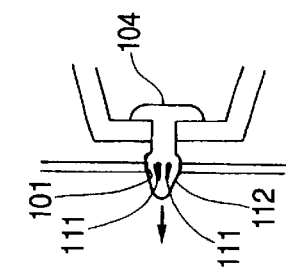
Figure 13:
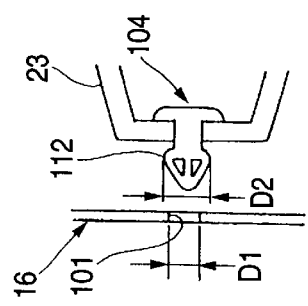
Figure 13:
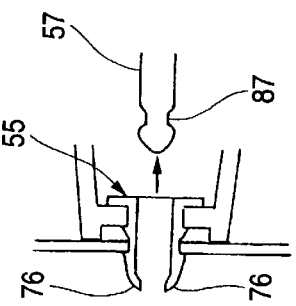
Figure 13:
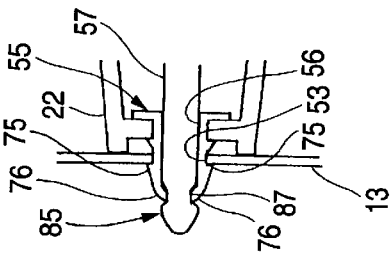
Figure 13:
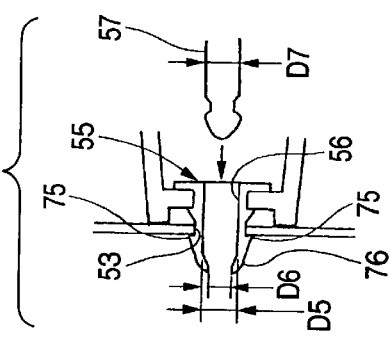
Figure 13:
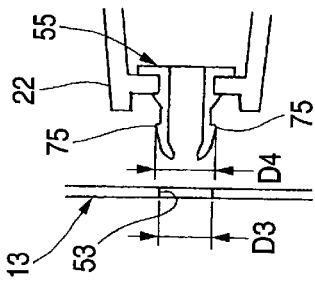
Figure 14:
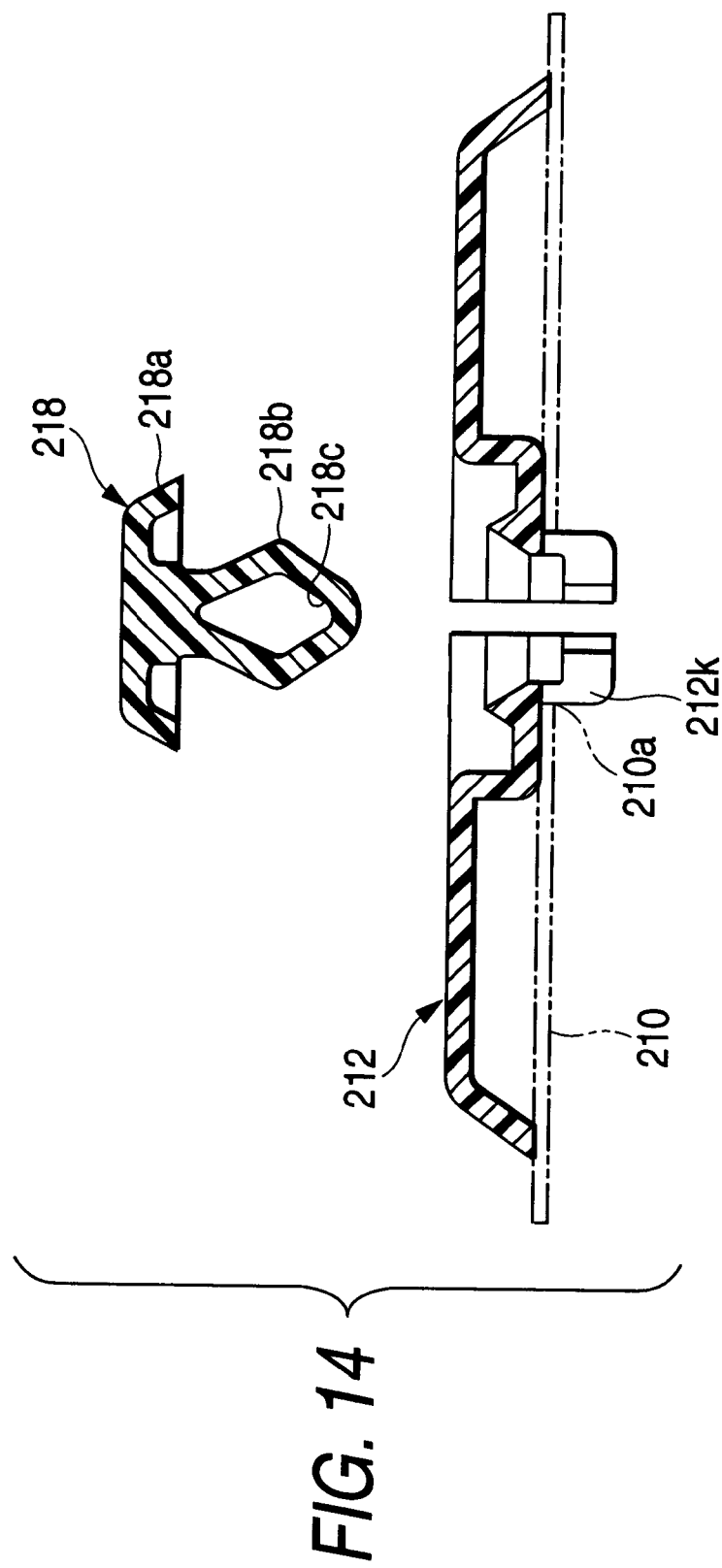
FIG. 14 is a diagram showing the conventional automobile trim panel attaching structure.

In FIG. 13A, assuming that an inside diameter of the through hole 101 pierced through the pillar is D1 and that an outside diameter of the distal end portion 112 of the clip 104 is D2, then D2>D1.

In FIG. 13B, the clip 104 is inserted into the through hole 101. As this occurs, the distal end portion 112 of the clip 104 contracts diametrically as the hollow portions 111, 111 contract, whereby the distal end portion 112 is allowed to pass trough the through hole 101.

FIG. 13C shows a state in which the clip 104 has been completely inserted, whereby the center pillar garnish 23 is fastened to the center pillar 16 with the clip 104. As shown in FIG. 13D, when a force is applied to the pillar garnish 23 in a direction indicated by an arrow so as to remove the pillar garnish 23 from the fastened condition the distal end portion 112 of the clip 104 contracts diametrically, whereby the clip 104 comes off the through hole 101 relatively easily.

In FIG. 13E, assuming that an inside diameter of the through hole 53 in the front pillar 13 is D3 and that outside diameters of the second projections 75, 75 of the grommet 55 are D4, then D4>D3.

When the grommet 55 is inserted into the through hole 53 then a state shown in FIG. 13F results. As this occurs, the second projections 75, 75 of the grommet 55 pass through the through hole 53 while contracting diametrically.

Assuming that an inside diameter of the central hole 56 in the grommet 55 is D5 and that an inside diameter of the distal end curved portion 76 is D6, then D5>D6. In addition, assuming that an outside diameter of the press-fit pin 57 is D7, then D7≧D6.

FIG. 13G shows a state in which the press-fit pin 57 has completely been press fitted into the central hole 56. Just prior to the completion of the press fitting of the press-fit pin, the distal end portion 85 of the press-fit pin 57 press opens (or expands diametrically) the distal end curved portion 76 of the grommet 55, then the distal end curved portion 76 fits into the annular grove 87.

In this state, since the press-fit pin 57 is press-fitted into the grommet 55, the second projections 75 of the grommet 55 cannot be contracted diametrically. Therefore, the front pillar garnish 22 is strongly fastened to the front pillar 13 without dropping the grommet 0.55 off the through hole 53.

In this state, the press-fit pin 57 is pulled out of the grommet 55. As the distal end curved portion 76 of the grommet 55 is simply removed from the annular groove 87 in the press-fit pin 57 to make that happen, the press-fit pin 57 can be easily pulled out.

As has been described with reference to FIGS. 1, 3, 5 and 7 above, according to the first aspect of the invention, there is provided the pillar garnish fastening structure for attaching the front pillar garnish 22 and the rear pillar garnish 24 with the first fasteners 42, 91 to the passenger compartment sides of the front pillar 13, the center pillar 16 and the rear pillar 17 which support the roof 11 of the vehicle, the pillar garnish fastening structure being characterized in that the first fasteners 42, 91 each includes the grommet 55 having the diametrically expandable divided distal end portion 71 and the cap 58 provided with the press-fit pin 57 adapted to be press fitted in the grommet 55, in that the divided distal end portion 71 of the grommet 55 is inserted into the through hole 53 in the pillar, and in that the press-fit pin 57 is press fitted in the grommet 55, whereby the press-fit pin 57 is attached to the grommet 55 and the diametrical contraction of the grommet 55 is prevented by the press-fit pin 57.

The press-fit pin 57 is attached to the grommet 55 by press fitting the press-fit pin 57 into the grommet 55 and the diametrical contraction of the grommet 55 is prevented by the press-fit pin 57, so that the external surface of the grommet 55 can be kept strongly pressed against the through hole 53 and the removal of the grommet 55 from the through hole 53 is made difficult, whereby the front pillar garnish 22 (and the rear pillar garnish 24) can strongly be attached to the front pillar 13 (and the rear pillar 17).

In addition, since the through hole 53 (and the through hole 97) provided in the front pillar 13 (and the rear pillar 17) may have the same configuration as that of the through hole 101 (refer to FIG. 8) for the clip 104 (refer to FIG. 8), even when the grommet 55 according to the invention is attempted to be used, no special machining is required. Consequently, it is possible to deal with both the vehicle specifications having and not having side air bags by using the same pillar garnish attaching holes but selectively using the conventional clip 104 and the first fasteners 42, 91 of the invention.

Consequently, there is no need to modify the basic constructions in order to increase the fastening force such as enlarging the fastener, changing the material of the fastener or using bolt and nut, thereby making it possible to suppress an increase in costs.

Furthermore, since the press-fit pin 57 is only press fitted into the grommet 55, in the event that the pillar garnishes 22, 24 have to be removed for some reason, for example, servicing, the grommet 55 diametrically contracts when the press-fit pin 57 is pulled out of the grommet 55, whereby the front pillar garnish 22 (and the rear pillar garnish 24) can be easily removed from the front pillar 22 (and the rear pillar 17).

According to the second aspect of the invention, the locking piece 62 adapted to be locked into the front pillar garnish 22 is provided on the cap 58.

The removal of the press-fit pin 57 provided on the cap 58 from the grommet 55 can be made difficult by the locking piece 62 provided on the cap 58.

In addition, the grommet according to the invention may be separated from the pillar garnish or may be formed integrally on the pillar garnish.

While only certain embodiments of the invention have been specifically described herein, it will apparent that numerous modifications may be made thereto without departing from the spirit and scope of the invention.

In the pillar garnish fastening structure according to the first aspect of the invention, since the fasteners are each constituted by the grommet having the diametrically expandable divided distal end portion and the cap provided with the pin adapted to be press fitted in the grommet, the divided distal end portion of the grommet is inserted into the hole in the pillar, and the pin is press fitted in the grommet, whereby the pin is attached to the grommet and the diametrical contraction of the grommet is prevented by the pin, the external surface of the grommet can be kept strongly pressed against the hole in the pillar and the removal of the grommet from the hole is made difficult, whereby the pillar garnish can strongly be attached to the pillar.

In addition, since the pillar garnish attaching hole provided in the pillar may have the same configuration as that for the conventional pin, even when the grommet according to the invention is attempted to be used, no special machining is required. Consequently, it is possible to deal with both the vehicle specifications having and not having side air bags by using the same pillar garnish attaching holes but selectively using the conventional clip and the fasteners of the invention, thereby making it possible to suppress an increase in costs.

Furthermore, since the press-fit pin is only press fitted into the grommet, in the event that the pillar garnish has to be removed for some reason, for example, servicing, the grommet diametrically contracts when the press-fit pin is pulled out of the grommet, whereby the pillar garnish can be easily removed from the pillar.

In the pillar garnish fastening structure according to the second aspect of the invention, since the locking piece adapted to be locked into the pillar garnish is provided on the cap, the removal of the pin provided on the cap from the grommet can be made difficult by the locking piece provided on the cap.

What is claimed is:

1. A pillar garnish fastening structure comprising:
   a pillar supporting a roof of a vehicle;
   a pillar garnish disposed in a passenger compartment side of said pillar; and
   a fastener for attaching said pillar garnish to said pillar, said fastener including:
      a grommet having a diametrically expandable divided distal end portion; and
      a cap provided with a pin adapted to be press fitted in said grommet,
   wherein said divided distal end portion of said grommet is inserted into a hole in said pillar, and
   wherein said pin is press fitted in said grommet, whereby said pin is attached to said grommet and the diametrical contraction of said grommet is prevented by said pin.

2. The pillar garnish fastening structure as set forth in claim 1, wherein a locking piece adapted to be locked into said pillar garnish is provided on said cap.

3. The pillar garnish fastening structure as set forth in claim 1, wherein said divided distal end portion of said grommet includes a distal-end curved portion which curves inwardly toward a distal end thereof and is disposed to protrude from said hole in said pillar, and
   wherein said pin has an annular groove receiving said distal curved portion of said grommet when said pin is attached to said grommet.

4. The pillar garnish fastening structure as set forth in claim 1, wherein said pillar garnish has a recessed portion and a bottom hole pierced in the bottom of said recessed portion, and
   wherein said grommet is inserted into said hole in said pillar and said bottom hole of said recessed portion, so that said grommet is attached to said pillar and said recessed portion.

* * * * *